(12) United States Patent
Gaber et al.

(10) Patent No.: US 8,751,364 B2
(45) Date of Patent: Jun. 10, 2014

(54) WIRE SPEED MONITORING AND CONTROL OF ELECTRONIC FINANCIAL TRANSACTIONS

(75) Inventors: Konstantin Gaber, Brooklyn, NY (US); Gregory Reider, Paramus, NJ (US); Ralf Roth, Greenwich, CT (US)

(73) Assignee: Deutsche Bank AG, New York, NY (US)

( * ) Notice: Subject to any disclaimer, the term of this patent is extended or adjusted under 35 U.S.C. 154(b) by 37 days.

(21) Appl. No.: 13/296,393

(22) Filed: Nov. 15, 2011

(65) Prior Publication Data

US 2012/0130919 A1 May 24, 2012

Related U.S. Application Data

(60) Provisional application No. 61/415,382, filed on Nov. 19, 2010.

(51) Int. Cl.
*G06Q 40/00* (2012.01)

(52) U.S. Cl.
USPC .......................................................... 705/37

(58) Field of Classification Search
USPC .................................................... 705/35–37
See application file for complete search history.

(56) References Cited

U.S. PATENT DOCUMENTS

| | | | |
|---|---|---|---|
| 7,769,996 B2 | 8/2010 | Randle et al. | |
| 7,778,915 B2 | 8/2010 | Angle et al. | |
| 2003/0167223 A1 | 9/2003 | Pledereder et al. | |
| 2003/0200172 A1 | 10/2003 | Randle et al. | |
| 2004/0122902 A1 | 6/2004 | Anderson | |
| 2004/0167840 A1 | 8/2004 | Tully et al. | |
| 2004/0220882 A1 | 11/2004 | Suto et al. | |
| 2008/0015970 A1* | 1/2008 | Brookfield et al. | 705/37 |
| 2008/0243675 A1 | 10/2008 | Parsons et al. | |
| 2008/0320088 A1 | 12/2008 | Jung et al. | |
| 2009/0271325 A1* | 10/2009 | Wilson | 705/36 R |
| 2009/0313160 A1 | 12/2009 | Kolten et al. | |
| 2010/0208729 A1 | 8/2010 | Oddie et al. | |
| 2011/0153521 A1* | 6/2011 | Green et al. | 705/36 R |
| 2011/0166982 A1* | 7/2011 | Cole et al. | 705/37 |

OTHER PUBLICATIONS

"Arista 7100 Series Switches", product information page, www.aristanetworks.com/en/products/7100series, accessed Oct. 4, 2011.

(Continued)

*Primary Examiner* — Hani M Kazimi
(74) *Attorney, Agent, or Firm* — White & Case LLP

(57) ABSTRACT

An in-line hardware message filter device inspects incoming securities transactions. The invention is implemented as an integrated circuit (IC) device which contains computer code in the form of on-chip hardware instructions. Data messages comprising orders enter the device in exchange-specific formats. Messages that satisfy pre-determined risk assessment filters are allowed to pass through the device to the appropriate securities exchange for execution. The system functions as a passive device for all legitimate network traffic passing directly or indirectly between a customer's computer and a securities exchange's order-acceptance computer. Advantageously, the invention allows the broker-dealer to check and pass messages or orders as they come through the system without having to store the full message before making a risk assessment decision. The hardware-only nature of the invention serves to maximize the speed of order validation and to perform pre-trade checks in a cut-through or store-and-forward mode.

14 Claims, 8 Drawing Sheets

(56) References Cited

OTHER PUBLICATIONS

"C-to-FPGA Tools from Impulse Accelerated Technologies", www.impulseaccelerated.com/app_financial.htm, product information page, accessed Oct. 11, 2010.
"Trade Response Latency Reduced to Under Two Microseconds by Combining NASDAQ ITCH and OUCH into a Single FPGA", press release dated Sep. 15, 2010.
"Market Data Processing Solutions Minimize Latency via Modular Software and C-to-FPGA Compilation", press release dated Jun. 1, 2010.
Mantara ExpressWay product information brochures, dated 2008/2009.
HPCWire: "Design Integrates Multiple Trading Functions onto Single FPGA", Sep. 15, 2010.
International Search Report issued in PCT/US2011/060717, dated Mar. 8, 2012.
Written Opinion issued in PCT/US2011/060717, dated Mar. 8, 2012.

\* cited by examiner

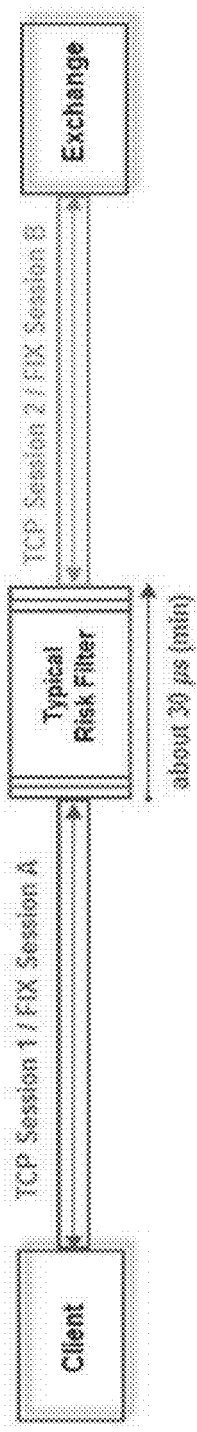
Fig. 1 Typical software based risk filter
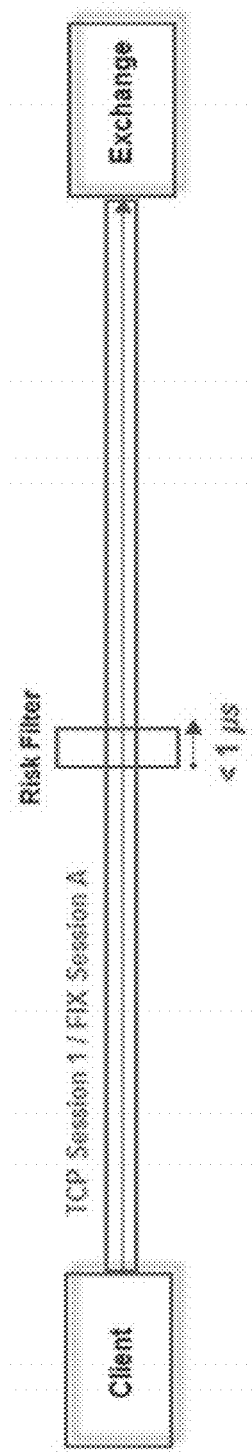
Fig. 2 FPGA-based risk filter
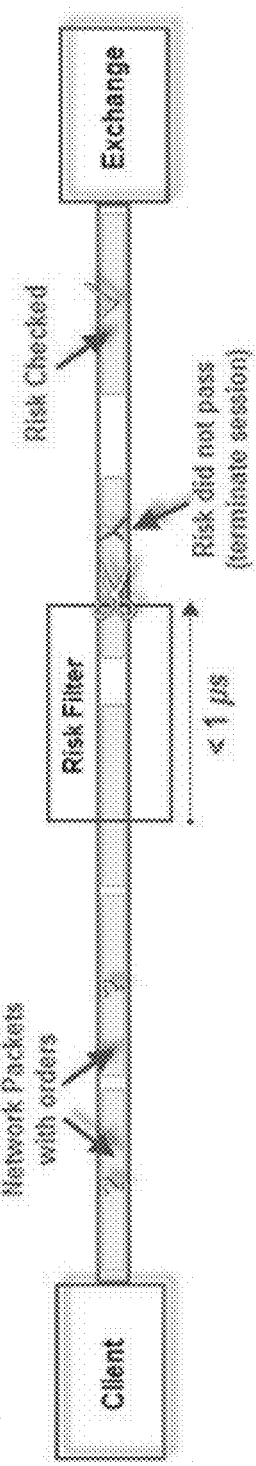
Fig. 3 FPGA based risk filter (packet/functional view)

Dedicated Hardware

Fig. 7 (continued)

| Risk Metric | Operator | Value | Enable/Disable | Notes |
|---|---|---|---|---|
| Max Shares | < | 100,000 | ☑ | Max share per order |
| Max Order Value ($) | < | 10,000,000 | ☑ | Shares x Limit Price |
| Max Order Notional ($) | < | 11,000,000 | ☑ | Shares x Live Price (or PrevDayClose) |
| % Away From Last | within | 10% | ☑ | Price to be within [LivePrice*(1-%), LivePrice*(1+%)] |
| Block Self-short Exempt | | ✓ | ☑ | Allow/Disallow SSE |
| Block ISO | | Agency/Principal | ☐ | Allow/Disallow ISO |
| Restricted list | contains | | ☐ | Disallow trading in securities on restricted list |
| Subpenny Rule | | | ☑ | Enforce sub penny rule |
| Threshold Securities | | | ☐ | |
| Locate broker check | | | ☐ | |
| Reprint Time in force | | | ☐ | |
| Total Value Per Period ($) * | < | 10,015,411* | ☐ | |
| Period Duration (ms) | = | 100,000,000 | ☐ | |
| Custom1 ** | | | ☐ | Just check if non-empty |
| Custom2 ** | ✗ | | ☐ | |
| Custom3 ** | ✗ | | ☐ | |
| Custom4 ** | ✗ | | ☐ | |
| Custom5 ** | ✗ | | ☐ | |

WIRE SPEED MONITORING AND CONTROL OF ELECTRONIC FINANCIAL TRANSACTIONS

This application claims the priority benefit of U.S. provisional patent application Ser. No. 61/415,382, filed on Nov. 19, 2010, the contents of which are incorporated herein in their entirety by reference.

I. BACKGROUND OF THE INVENTION

1. Field of the Invention

The present invention is directed to managing pre-trade risk of financial securities transactions. More specifically, the present invention is directed to a reprogrammable high-speed hardware device containing hardware-embedded computer code which parses and analyzes incoming securities orders to ensure that the orders are within the risk, compliance and regulatory parameters established by a broker-dealer or other financial institution.

2. Description of the Related Art

A broker-dealer is a term used in United States financial services regulations to describe a financial institution that trades securities for its own account or on behalf of its customers. Although many broker-dealers are independent firms solely involved in broker-dealer services, many others are business units or subsidiaries of commercial banks, investment banks, or investment firms.

When executing trade orders on behalf of a customer, the institution is said to be acting as a broker. When executing trades for its own account, the institution is said to be acting as a dealer. Securities bought from customers or other firms in the capacity of dealer may be sold to other customers or other firms acting again in the capacity of dealer, or the securities may become a part of the firm's holdings.

Broker-dealers have a responsibility to perform risk/compliance validation of incoming orders before they are submitted to market. Broker-dealers also have a responsibility to perform pre-trade risk/compliance checks on all incoming customer orders where the dealer acts as the executing broker. There are currently software-only systems in place today which perform such checks. Such software-only risk-management products have to wait for an entire incoming message to go through the whole network stack before examining the message in accordance with risk-management procedures and deciding whether or not to pass the order to the exchange. These software-only systems introduce latencies which can be prohibitive for particular customer types, such as those that require very high-speed transactions.

in-FPGA Trading Systems (Seattle, Wash.) has announced a hardware-accelerated automated trading reference system. The in-FPGA system combines the NASDAQ ITCH and OUCH order entry protocols on a single FPGA logic processing board, and purportedly reduces trade response latency to under two microseconds. However, this system originates orders based upon pre-defined market conditions. That is, the in-FPGA system is pre-programmed to review current market condition, and if the system determines that it can take advantage of current pricing and availability of particular securities, the system will generate new orders to take advantage of such market conditions. The in-FPGA system is not programmed to conduct risk management assessments of new incoming orders.

II. SUMMARY OF THE INVENTION

One aspect of the present invention is directed to a reprogrammable integrated circuit (IC) device comprising embedded hardware instructions for performing risk assessment of a securities transaction. The instructions code for a method comprising the steps of:

a) receiving by the IC device an incoming order for the securities transaction;
b) parsing the order by the IC device into a plurality of order components;
c) evaluating by the IC device one or more order components in accordance with pre-established criteria; and
d1) if the order components pass the pre-established criteria, permitting the order to pass to a securities exchange for subsequent handling; or
d2) if the order components do not pass the pre-established criteria, truncating the order before passing the order to a securities exchange.

Another aspect of the present invention is directed to a method for performing risk assessment of a securities transaction using a reprogrammable integrated circuit (IC) device containing embedded hardware instructions for performing the method. The method comprises the steps of:

a) forwarding to the IC device an order for the securities transaction;
b) parsing the order by the IC device into a plurality of order components;
c) evaluating by the IC device one or more order components in accordance with pre-established criteria; and
d1) if the order components pass the pre-established criteria, permitting the order to pass to a securities exchange for subsequent handling; or
d2) if the order components do not pass the pre-established criteria, truncating the order before passing the order to a securities exchange.

The present invention is directed to an in-line hardware message filter device (also referred a system) which inspect network traffic over a computer network protocol such as TCP/IP or UDP. The invention is implemented as an integrated circuit (IC) device which contains computer code in the form of on-chip hardware instructions. The device can be custom-designed, or it may be a commercially-available reprogrammable IC device, such as an FPGA, PAL, PLA, or CPLD device, which contains embedded hardware instructions for performing the invention. The IC device can handle a throughput of about 500,000 incoming orders per second and support a minimum of about 30 TCP sessions. The IC device is reprogrammable locally or remotely, for example, over the Internet or a private local area network. The IC device can comprise embedded hardware instructions to periodically receive updated pre-established criteria for the risk assessment review. Such criteria can comprise one of more of a restricted securities trading list; minimum or maximum order size; minimum or maximum order dollar value; minimum or maximum notional value; order type; broker identification; and securities or currency settings. The IC device can comprise embedded hardware instructions to periodically (regularly or irregularly) receive updated criteria, for example, intradaily, daily, or weekly.

Data messages comprising orders enter the device in exchange-specific formats, such as FIX, OUCH, ArcaDirect, or other formats, from various exchanges across the globe. Messages that satisfy pre-determined risk assessment filters are allowed to pass through the device to the appropriate securities exchange for execution.

Data messages comprising orders that do not pass specific risk-assessment filters are truncated. Truncation is to be understood as any means of modifying or deleting a message so that it cannot be successfully processed downstream of the risk-assessment filters. The messages may be completely truncated, that is, deleted, so that they do not pass to the exchange. Such complete truncation may take place by terminating the message's TCP session or by other means. Alternatively, messages which do not pass the risk-assessment filters may be partly truncated in a way that they will be rejected by a securities exchange which requires a complete message in order to place a securities transaction. Examples of partial truncation includes modification, garbling, and deletion of a portion of a message so that the message is not recognized as a complete order by a securities exchange and is rejected by the exchange or triggers a session/application level rejection from an exchange. The invention can also comprise embedded hardware instructions for logging inspected orders for data management purposes.

The inventive hardware filter device provides significantly faster message processing than existing software-only products. Advantageously, the present invention allows the broker-dealer to check and pass messages or orders as they come through the system without having to store the full message before applying making a decision. The hardware-only nature of the present invention serves to maximize the speed of order validation and to perform pre-trade checks In certain embodiments, orders pass through the hardware filter device in cut-through mode. That is, the hardware filter device acts upon orders as the orders pass through the device. If the orders do not violate any of the risk assessment filters, the orders exit the device and pass to an exchange for processing. Incomplete orders can be either truncated deliberately, or the incomplete orders can be allowed to pass through the device to an exchange which will reject incomplete order packets.

In certain embodiments, the hardware filter device functions in a store-and-forward mode. That is, if the filter device recognizes an order as being incomplete, or one of a series of sequential orders, the device will accordingly store the order in temporary memory until the remaining portion(s) or packet(s) of the order(s) arrive. After the entire order (or entire series of orders) has been received, the filter device will then apply the risk assessment filters and will either pass the order to an exchange or truncate the order, as discussed. Alternatively, if the hardware filter device recognizes that a partially-received order will violate a risk assessment filter, the device can truncate the incomplete order and disregard any subsequent portions of the order.

In particular embodiments, the inventive device employs components of both cut-through and store-and-forward modes. The inventive device can contain hardware instructions for cut-through and/or store-and-forward mode(s) as one of the device settings, discussed further below.

The present invention allows orders to be validated at essentially wire-speed with minimal order latency delays and without compromising required functionality. Wire-speed is intended to mean that the invention operates to process incoming message traffic at hardware-speeds, without having to undergo software-only processing. All message traffic is processed on-chip on hardware and does not rely on software instructions loaded in volatile computer memory, thereby minimizing latency and allowing rapid transaction handling. Although the invention provides profound advantages for all customers, the most latency sensitive customers will be particular benefited.

The system functions as a passive device for all legitimate network traffic passing directly or indirectly between a customer's computer and a securities exchange's order-acceptance computer, for example, running via TCP and FIX sessions. In further embodiments, the inventive hardware-only solution can have expanded functionality in combination with software instructions.

The device inspects a content of network traffic over the TCP/IP (or other) protocol. Incoming data messages comprising customer orders will be parsed as the messages go through various pre-trade filters built into the device. The device may comprise embedded hardware instructions for blocking a session due to a security breach or a transaction failing one or more criteria. That is, messages that did not pass the pre-trade risk inspection, and all subsequent messages on the same session, can be blocked from going to the exchange until the broker-dealer chooses to remove the block. Such blocking actions prevent the broker-dealer from processing trades which may subject the broker-dealer to undue risk.

III. BRIEF DESCRIPTION OF THE FIGURES

FIG. 1 illustrates a conventional risk-check process, wherein pre-trade checks are performed in software;

FIG. 2 illustrates an embodiment of the present invention, wherein a customer's order to a securities exchange successfully passes through a hardware risk filter in the form of an FPGA-based IC device;

FIG. 3 illustrates an embodiment of the invention, wherein an order did not pass a risk filter and therefore was truncated before exiting the IC device

IV. DETAILED DESCRIPTION OF THE INVENTION

Figure 4:
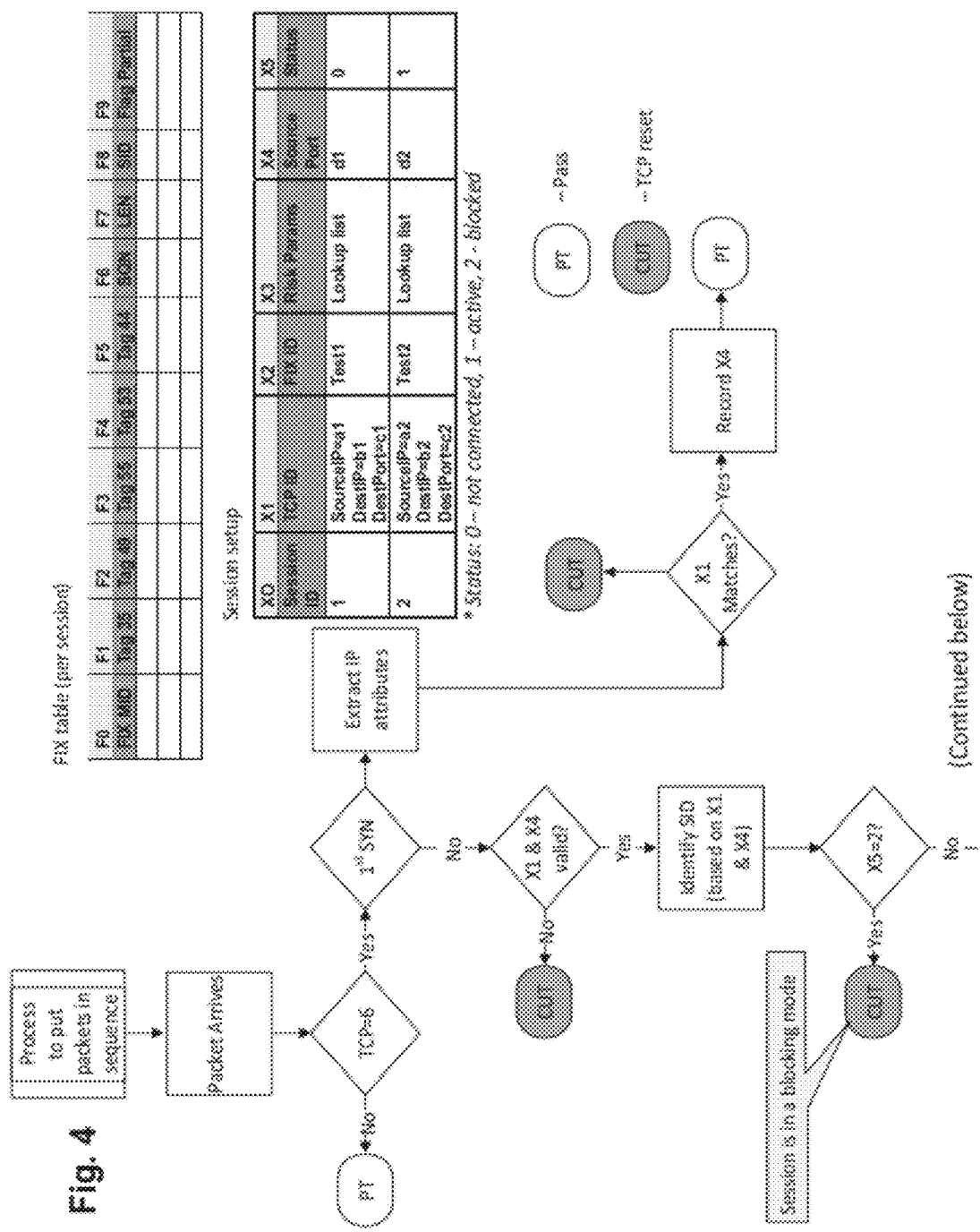
FIG. 4 illustrates a flow chart showing procedural steps for conducting a risk analysis assessment in accordance with an embodiment of the inventive method.
Figure 4:
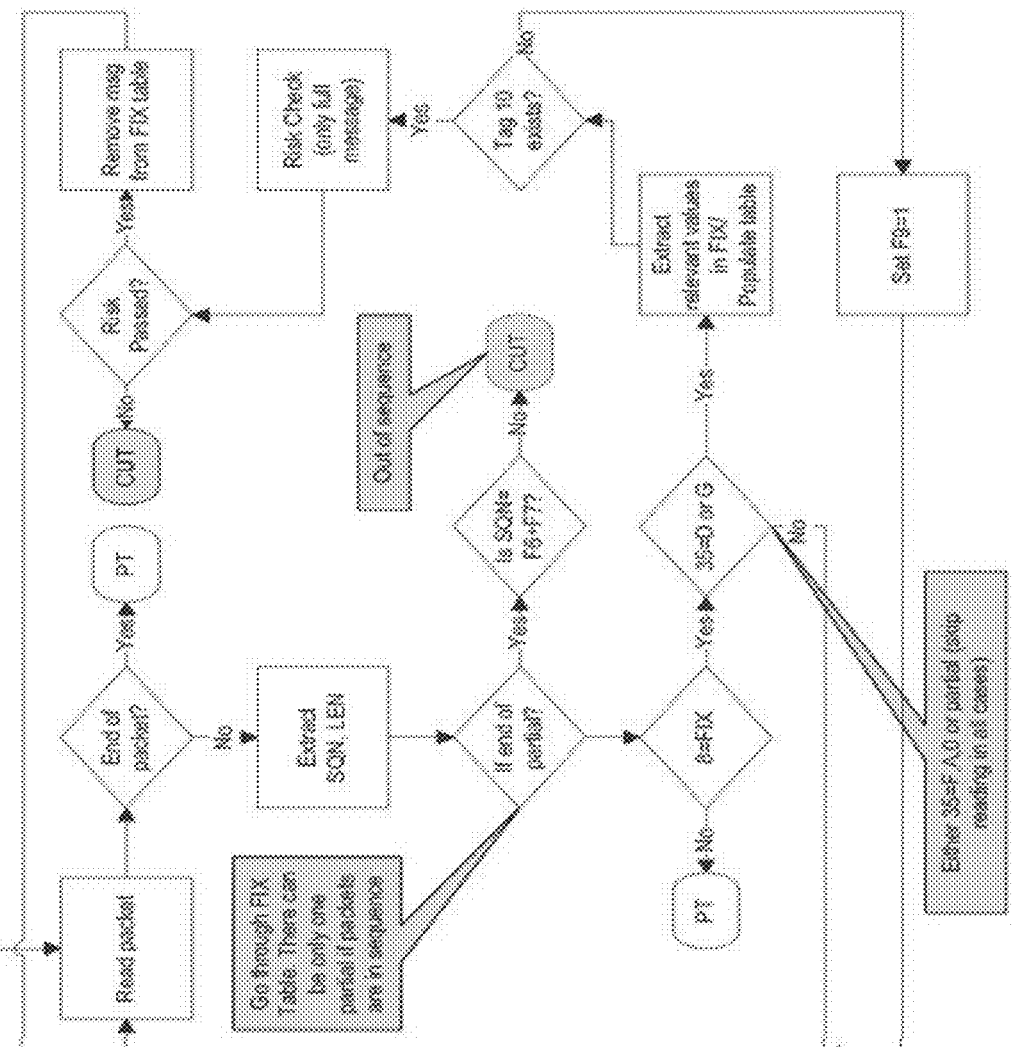

The present invention is implemented as a reprogrammable integrated circuit (IC) device comprising embedded hardware instructions for performing risk assessment of a securities transaction. The device may be in the form of an application-specific integrated circuit IC chip, or ASIC, which are custom-designed for specific functions. For example, the broker-dealer may partner with integrated device manufacturers which design and manufacture custom-built chips, such as Infineon Technologies, Freescale Semiconductor, or Avago Techologies. Alternatively, the broker-dealer may partner with fabless ASIC suppliers such as Arrow Custom Logic Solutions, eASIC, iC-Logic, and Intelliprop Inc., which specialize in the design and sale of IC chips but which utilize a semiconductor foundry for actual manufacture. Each supplier will provide specific information for preparing customized chips for a particular application.

Alternatively, the inventive system may be in the form of a commercially-available reprogrammable IC device. Examples of reprogrammable IC devices include, but are not limited to, FPGA (field-programmable gated array), PAL (programmable array logic), PLA (programmable logic array), and CPLD (complex programmable logic device) devices. These kinds of integrated circuit devices comprise IC chips and are designed to be configured by the customer or designer after manufacturing, typically using a hardware description language, such as Verilog or VHDL, or a computer programming language such as SystemC or C/C++. Each IC device will generally be configured using a particular computer language recommended by the chip vendor. The broker-dealer can partner with a vendor to develop code which would be embedded in the hardware of the IC device, or the broker-dealer can purchase an off-the-shelf reconfigurable IC device and design the computer code instructions.

In such embodiments, a programmer would use a particular program or programming language on a local or networked computer to generate computer code instructions for conducting risk-management review of incoming orders in accordance with the present invention. A compiler or other programming means would then be used to embed the risk-management rules into the IC device as computer hardware instructions.

The embedded risk-management rules on the IC device can be updated as necessary by modifying the computer code and embedding the refreshed instruction code to the IC chip or device. For example, when a list of tradable securities is updated, to add or delete particular securities or particular issuers, the updated computer code would be embedded in the IC device. Depending on the particular implementation of the inventive method, portions of the embedded code may be updated, or all of the code embedded on the chip may be replaced with updated code.

For ease of handling, the inventive device will generally be mounted on or in some kind of support structure, such as a card or printed circuit board. The circuit board may be installed in the computer in a conventional or proprietary bus slot, as is known in the art. The IC device may also be commercially available in the form of a circuit board comprising one or more IC chips and the associated circuitry.

The IC device can be installed in any kind of computer system. Such a computer system may contain a processor, an input device such as a keyboard or mouse, memory such as a hard drive and volatile or nonvolatile memory, and computer code for the functioning of the invention. The computer system may be a conventional mainframe, microcomputer, or minicomputer, or it may be a custom-designed computer. The computer system will typically be a single computer system, although in certain embodiments, it may comprise a plurality of networked computers, for example, in a client/server arrangement. That is, in certain embodiments, the computer comprising the IC device may function as a main computer, and operations such as data recordation or data storage may be passed on to one or more client computers. A client computer can have its own processor, input means, and memory, or it may be a dumb terminal which does not have its own independent processing capabilities, but relies on the computational resources of another computer, such as a server, to which it is connected or networked.

The computer system may also be networked with other computers over a local area network (LAN) connection or via an Internet connection. The system may also comprise a backup system which retains a copy of the data generated or processed by the invention. The computer system may also be set up to use symmetric multiprocessing (SMP), a multiprocessor computer hardware architecture where two or more identical processors are connected to a single shared main memory and are controlled by a single operating instance.

The components of the computer system may be conventional, although the system will generally be custom-configured for each particular implementation. The computer system may run on any particular architecture, for example, personal/microcomputer, minicomputer, or mainframe systems. Operating systems (OS) may include UNIX/Linux; SPARC, POWER and Itanium-based systems; z/Architecture and System/360; and Apple OSX and Microsoft Windows. The computer system will typically be optimized to minimize OS overhead and maximize throughput of the IC device.

In one embodiment of the invention, the IC device is configured to be capable of a high throughput and supporting a large number of TCP sessions per system. For example, the device can handle a throughput of about 500,000 inspected FIX/OUCH messages per second, and support a minimum of at least 30 TCP sessions per system. In one embodiment of the invention, the total one-way latency contribution of the hardware device is generally about 1 microsecond per packet.

In certain embodiments, the system has the capability of being managed remotely, for example, for updates to the risk management criteria. The system can also generate alerts via network messages, E-mail, API alerts, or other means to notify the broker-dealer of session drops and other predefined actions or activity.

For ease of discussion, the disclosure herein makes reference to dollars as an example of a currency. However, it is to be understood that there is no restriction on the kind of currency in use with the invention. The invention is equally applicable to any currency, such as euros, francs, pounds, rand, or yen. In particular embodiments, the IC device can review incoming orders which are priced in multiple currencies. For example, the IC device can comprise hardware instructions for permitting it to review incoming orders denominated in U.S. dollars, Canadian dollars, and euros.

The disclosure herein also makes reference to share purchases or share sales as examples of a financial transaction. The invention is nevertheless applicable to risk assessment of any kind of financial securities such as buying or selling equity securities, such as stocks or ADRs (American Depository Receipts); debt securities such as swaps; and currency instruments such as currency futures.

The risk checks to be performed on parsed incoming orders can involve examination according to any particular pre-established criteria. Representative but non-limiting and non-exhaustive examples of such pre-established criteria include the following items.

A. Restricted Securities List—

Checking a securities symbol or ticker against a predefined list of securities which customers can trade. The restricted securities list may be in the form of a list of the securities in which a customer can trade (a "white list"), or the list can be a list of all the securities that customers are not permitted to trade (a "black list"). There may be a lookup table or other predefined listing of tradable securities, as implemented by the broker-dealer. The particular securities in the predefined restricted securities list can be modified periodically by the broker-dealer, and can vary according to the customer, or the list can be identical for all customers (See FIG. 6). The length of the securities symbol field can be padded as necessary with leading null characters or other placeholder characters. If an order contains a securities symbol which is on the restricted securities list (black list), or if the securities symbol is not in the customer's tradable universe (white list), the device can drop the session and issue an error message. There may also be a periodic (daily, weekly, monthly, etc.) certification process with the customer to ensure that the customer's securities of interest are included on the security master list.

B. Shares Per Order—

A broker-dealer may set a rule requiring a minimum or maximum number of shares per order to reduce risk (for large orders) or to eliminate odd-lot trades (for small orders).

C. Dollar Value Per Order—

There may be a minimum or maximum dollar value per order in order to reduce risk (for high dollar-value orders) or to reduce transaction costs (for low dollar-value orders).

D. Maximum or Minimum Notional Value Per Order—

The notional amount can be calculated as quantity x price. Price can be based on the current market price, previous day's closing price, or another accepted, price level. The system may store securities/price pairs as follows:

MSFT, 24.68
IBM, 134.89
APPL, 286.86
VIA.B, 36.52

If the securities symbol is not available when the order is scanned by the system (that is, the symbol is not on the securities list), the system may drop the session and issue an error message. The broker-dealer can have a periodic (daily, semiweekly, weekly, etc.) certification process with the customer to verify that the broker-dealer can cover all symbols in the customer's tradable universe. The lookup price can be used for calculation of notional value.

Since replace orders, on some order entry protocols, do not contain a symbol in the incoming message, the system can be configured to work around this situation. In one embodiment, the system caches all new orders, which can be done for logging purposes. A sample order log entry can be expressed as "TimeStamp, OrderToken, Stock, Qty, Price".

When a replace order arrives, the system may look up the original order token in the log table and extract the appropriate securities symbol for a subsequent price lookup.

E. Restricted Order Types—

Certain order types can be prohibited, and the predetermined criteria will not allow such restricted order types to proceed to fulfillment and the orders will be truncated.

F. Broker Identification (Locate Broker)—

The broker identified in the securities order can be compared to a (configurable) list of pre-qualified brokers. If a designated broker in the order is not on the pre-qualified list, the order can be disallowed. For example, if the list of valid locate brokers is DB [Deutsche Bank], GS [Goldman Sachs], MS [Morgan Stanley], CS [Credit Suisse], NM [Nomura Securities], and BC [Barclays Capital], and the order does not contain any of these symbols, the order would not pass the risk management criteria and would be refused and truncated.

If any of the pre-established risk criteria is violated, or cannot be recognized by the system (e.g. price is outside an expected range), the securities order at issue will be considered as violating the broker-dealer's risk regulations and will be rejected and truncated by the inventive hardware system. Instead of declining to process the order, the system will truncate, for example, garbling a packet, and can issue a TCP reset for the particular session and go into "blocking" mode on both primary and backup IPs. Although the truncated or garbled securities order may proceed to the securities exchange, the exchange will recognize the order as incomplete and incomprehensible, and the order will be rejected.

In a limited number of exceptional circumstances, there may instances when an order will not pass the risk management filters but will still be allowed to proceed to the exchange. For example, if a packet CRC check sum is invalid (e.g. noise on a wire), the packet may be allowed to be forwarded to the exchange without terminating the session.

In one embodiment, a user may have the ability to remotely update the reprogrammable chip's settings periodically, such as intra-day, once a day, or weekly, either though a graphical user interface (See FIG. 7) or via a configurable script/API/CLI. Examples of such actions may include inspecting specific fix tags on/off, changing risk limits, adding list values, and other settings. To simplify the coding process, such updates may have the appearance of changing a setting through a user interface or script, although these updates will generally send updated compiled hardware code instructions to the IC device.

The system may also have a configurable table to control the reprogrammable device's actions. An example of a configurable table is provided below:

| Protocol | Tag/Offset | Operator | Value/List | Condition | Enabled | Comments |
|---|---|---|---|---|---|---|
| FIX | 53 | Less | 1000 | Always | Yes | Quantity |
| FIX | 5700 | In | DB, GS, MS, JP | If 54 = 5 | Yes | Locate Broker |
| FIX | 18 | Not in | F | Always | Yes | ISO order type |
| FIX | 55&65 | Not in | IBM, VIA/B | Always | No | Restricted List |
| OUCH | [16, 4] | Less | 1000 | Always | Yes | Quantity |

A. Protocol:

Indicates FIX, OUCH, ArcaDirect or any other protocol that will dictate how to read the table.

B. Tag/Offset:

In the FIX protocol, this field indicates a tag number to look for. In the OUCH (or other binary protocol) protocol, this field indicates offsets.

C. Operator:

The following operators are examples of operators which can be used in the risk management rules criteria: <,<=,=,=>,>, in, not in. The broker-dealer may support additional operators and concatenation of operators.

D. Value/List:

This field can be a single value, or a list of values. In particular embodiments, if the content of a field is too large to fit in the memory of a programmable chip, the broker-dealer may store the content in a host memory.

E. Condition:

Check for a specific tag or conditional. For example, the system may check tag 5700 values, only if tag 54=5.

The above conditions are merely exemplary, and other features or risk assessment criteria can be added to the table above. For example, cut-through and/or store-and-forward modes, as previously discussed, can be incorporated to the table as additional conditions or operating parameters.

On occasion, a customer's session may terminate for any number of reasons. If a customer's session drops due to normal TCP disconnect, the present invention will generally support the customer's ability to reconnect to the system and continue securities transactions. If the session is deliberately dropped by the system due to the risk of a security breach, the customer will not be able to re-establish a session, and will have to communicate with the broker-dealer in accordance with established policy for connection authorization.

Although one programmable circuit device will generally suffice for securities transaction risk management, a broker-dealer may wish to have two such programmable devices installed in parallel for redundancy. One device can be designated as the primary device, and the other device can be designated as a standby device. If the primary device fails or is taken from active service, the standby device will generally contain have all session information from the active device to continue providing securities risk management.

The system may also maintain a log of the orders inspected according to the invention. Data that may be logged include TimeStamp, OrderToken, Security, Quantity, and Price per order. Other fields which may be logged will be apparent to the skilled practitioner.

If a risk check fails and a message is truncated, the system may provide an alert to an operator or other individual having responsibility for unprocessed or truncated orders. The alert may be in the form of an E-mail message, screen alert display, or other form of alert, and may include the order details and other information. The system may also provide an alert to the customer and furnish the reason the securities order did not pass one of more of the risk management criteria.

The risk management criteria will generally be readily configurable during runtime. For example, according to the NASDAQ specification for the OUCH order protocol, the field "Quantity" for an order is located at offset 16 with length 4. If the location or length of this field is shifted it by 1 byte, the configuration file can be updated without requiring changes to the underlying code. Other non-limiting examples of fields which can be updated on a periodic basis during runtime include risk values and stock/price pairs.

In one embodiment, all devices in use can be controlled using a central interface or singular access point. For example, if there are 20 devices in use at various locations, and each device needs to have updated market data loaded on it, a central interface can be used to push data or computer code to all the devices. The devices can be connected to the central interface via a private internal network, or via a public network such as the Internet using a secure protocol. Such configurations can be readily prepared by a skilled practitioner.

A graphical user interface or command line on the main computer can be used, to manually shut down a particular session. If automated shutdowns are deemed necessary, such shutdowns can be performed using an application programming interface provided by the chip manufacturer.

FIG. 1 shows a typical prior art scenario, where pre-trade checks are performed in software. The following exemplary sequence of actions takes place.
1. A customer establishes both TCP and FIX sessions with a broker;
2. A broker establishes separate TCP and FIX sessions with a market;
3. The customer sends an order to the broker over the network;
4. The broker receives an order and translates it in a specific format that software can understand;
5. A software program performs all the pre-trade checks and translates the order back to a network format; and
6. The order is sent from the broker to the market for execution.

The average duration for this software based risk check is about 30 microseconds per transaction, and requires opening up two TCP/Fix sessions (A and B) to perform the check.

In contrast to prior art methods, the present invention functions in the following manner, as illustrated in FIG. 2:
1. A customer establishes both TCP and FIX sessions with an exchange; and
2. A device according to the present invention sits in-line and inspects messages as they pass through the system.

As shown in FIG. 2, there is only a single TCP session/FIX session between the customer and the exchange. This single TCP/FIX session permits more rapid order processing using the present invention as compared to prior methods exemplified by FIG. 1, which employ a first TCP/FIX session between the customer and software-based risk filter, and a second TCP/FIX session between the risk filter and the exchange. The hardware-based risk filter can inspect orders in a cut-through mode or in a store-and-forward mode, and allows orders which pass security criteria to move to the securities exchange.

The average duration of the hardware-based risk check, as exemplified in FIG. 2, is only about 1 microsecond, that is, about 1/30 of the duration as compared to the software-based risk check exemplified in FIG. 1. Accordingly, a user can better profit from the arbitrage between buy and sell offers by reducing the amount of time needed for an order to pass the risk check. In addition, a customer can obtain more accurate pricing and can take financial positions more rapidly. As financial firms maintain a continuous interest in reducing transaction processing time, the present invention allow firms to improve order handling.

Basic functional principles for truncating an order in accordance with an embodiment of the invention are illustrated in FIG. 3. If an order does not pass the risk filter, the message will be truncated. As discussed above, truncation can involve terminating transmission of the order so that it does not arrive at a securities exchange, or it may involve garbling or deleting a portion of an order so that the order cannot be successfully processed by the securities exchange and is refused.

As shown in FIG. 3, if a securities order received from a customer does not pass the risk filter, the order is truncated. The time necessary to parse, risk-check, and truncate the order is about 1 microsecond. The truncated order exits the risk filter and proceeds to the exchange, where it will be rejected as incomplete and therefore not processed. The truncated order will typically be logged or recorded, for example in a database or spreadsheet, so that the broker-dealer can inspect the reason for the truncated order. The customer can also be informed that the order was rejected and furnished the reasons for the rejected order.

FIG. 4 illustrates a flow chart showing steps in accordance with an exemplary embodiment of the inventive method. The flow chart illustrates that an incoming order is parsed into order components, such as (but not limited to) order type, stock, quantity, and price. If any of the order parameters are not valid, or if the order is not complete or contains errors, the order is truncated ("cut" or "TCP reset"). If the order is successfully parsed, the order then passes to the risk filters. If the order does not pass any of the risk filters, the order is truncated. Only if the order successfully passed the filters will the order be passed through to the exchange ("PT" or "pass-through").

Figure 5:
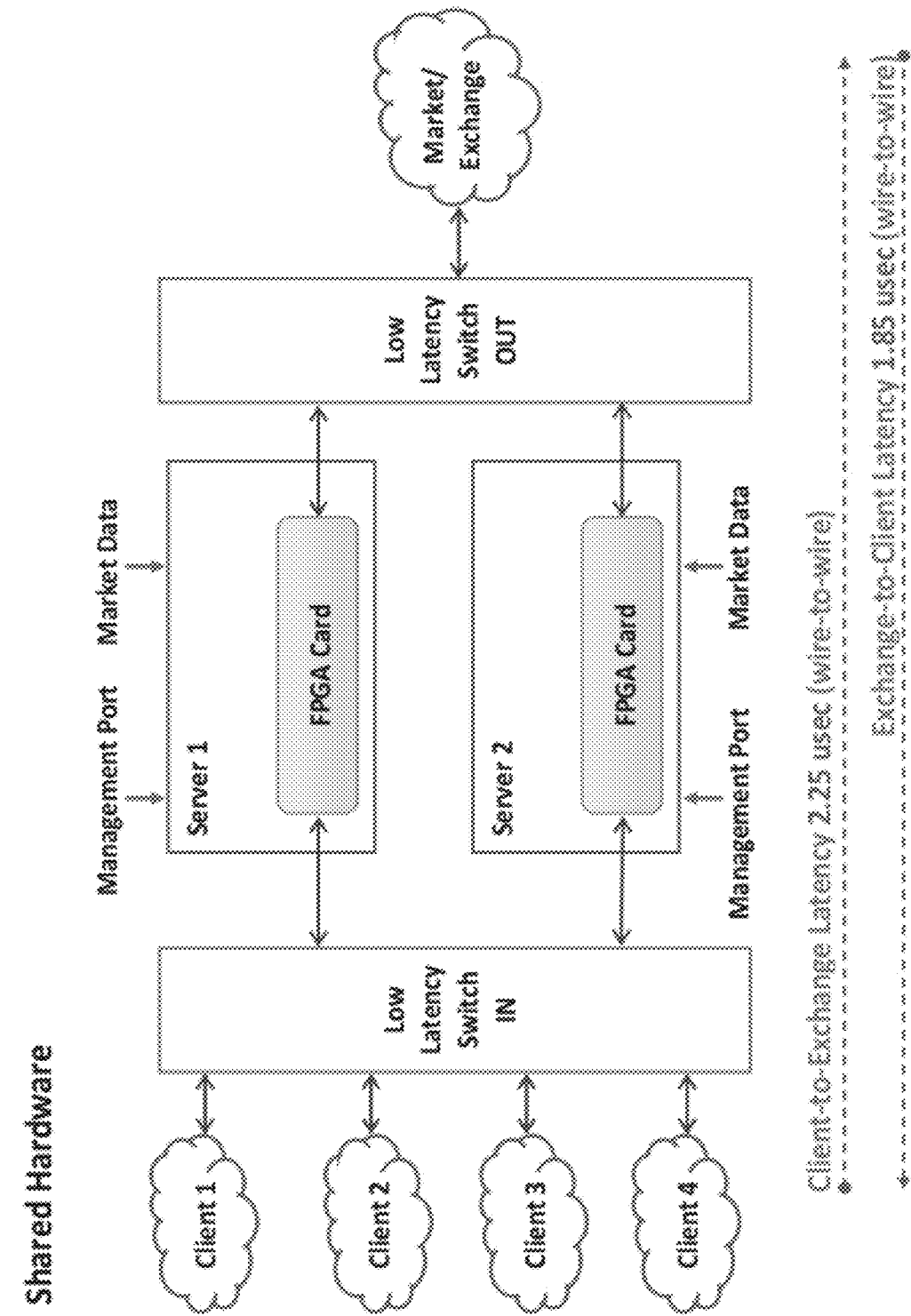
FIG. 5 illustrates shared hardware and dedicated hardware embodiments of an embodiment of the invention.
Figure 5:
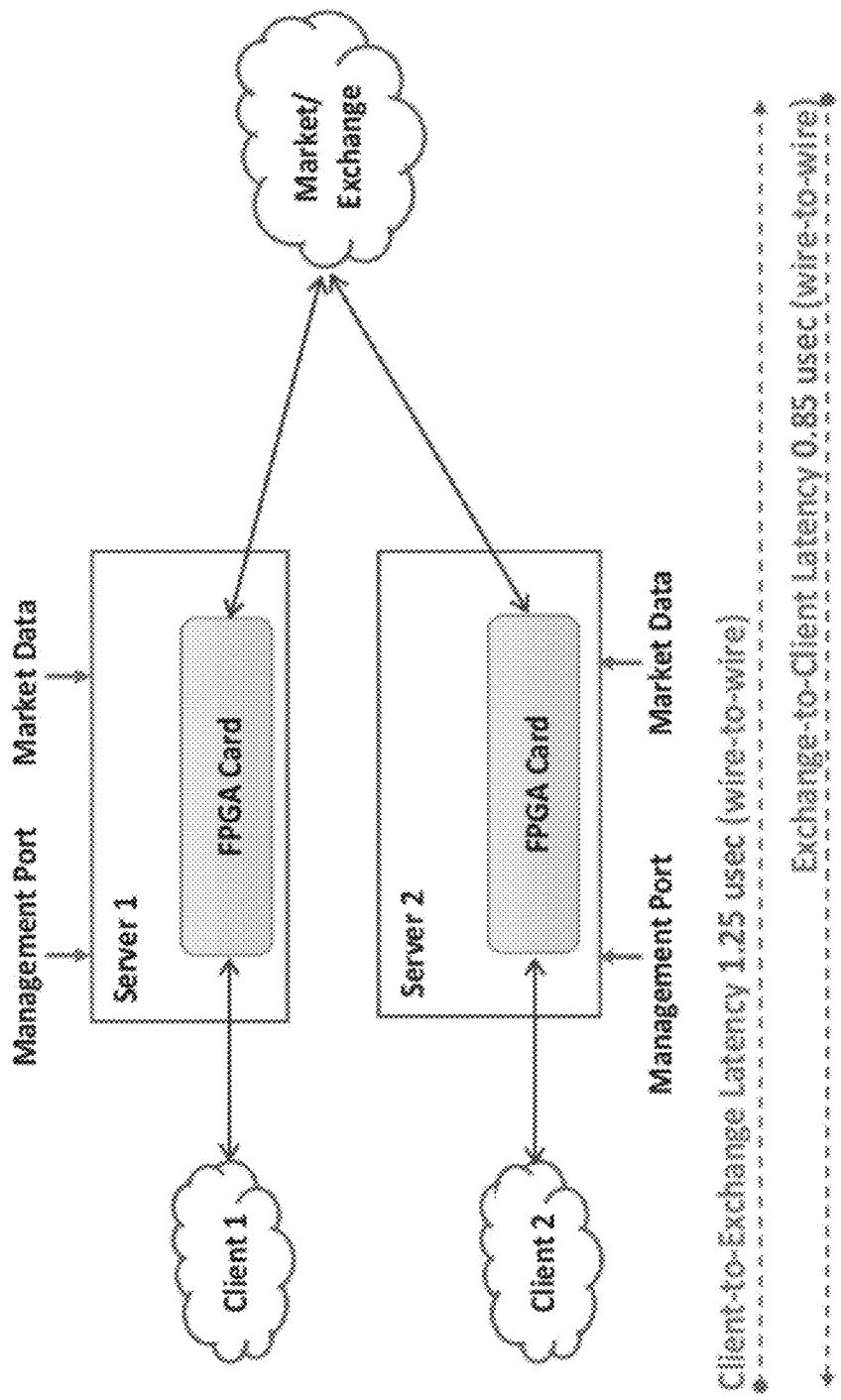

FIG. 5 illustrates exemplary shared hardware and dedicated hardware implementations of the present invention. In the shared hardware implementation, orders received from a plurality of customers first enter a high-speed, low latency switch, for example, an Arista 7124sx Series switch manufactured by Arista Networks, Santa Clara, Calif. The switch is connected to a plurality of servers, each server comprising a reprogrammable IC device. In this implementation of the invention, the IC device is an FPGA card. The switch passes the order to the next available server and FPGA card of the plurality for risk analysis. If the order passes the risk filters, the order exits the server and passes to a second high-speed, low latency switch. The second switch maintains a connection between the plurality of servers/IC devices and the securities exchange so that orders passing through the respective IC devices can move rapidly to the securities market or exchange for handling. The total time for the order to be processed, from the customer to the exchange, occurs at wire speed and is about 2.25 microseconds. This embodiment can be used for customers with relatively low transaction volumes or for pooled use of common equipment.

After an order is processed by the exchange, the order particulars are returned via the reverse route back to the customer. That is, the order passes from the exchange or market back through the server and to the customer. As the order particulars do not need to be parsed or reviewed by the IC device, a customer's receipt of the order acknowledgement is rapid, about 1.85 microseconds.

In the second exemplary embodiment shown in FIG. 5, comprising dedicated hardware, orders from a customer pass directly from the customer to the server comprising a reprogrammable IC device according to the present invention. The orders are parsed, as previously discussed, and orders which pass the risk analysis filters are transmitted directly to the market or exchange for handling. This embodiment is particularly rapid, and the latency between the customer and the exchange is about 1.25 microseconds. Receipt of the order particulars by the customer is also rapid, taking about 0.85 microseconds. This embodiment provides a direct connection to the risk analysis filters for customers, and can be used for particular customers who require maximum transaction speed or who have high transaction volumes.

Although the illustrated embodiments in FIG. 5 have different hardware layouts, both embodiments nevertheless provide dramatically faster hardware filtering as compared to prior software-only methods.

Figure 6:
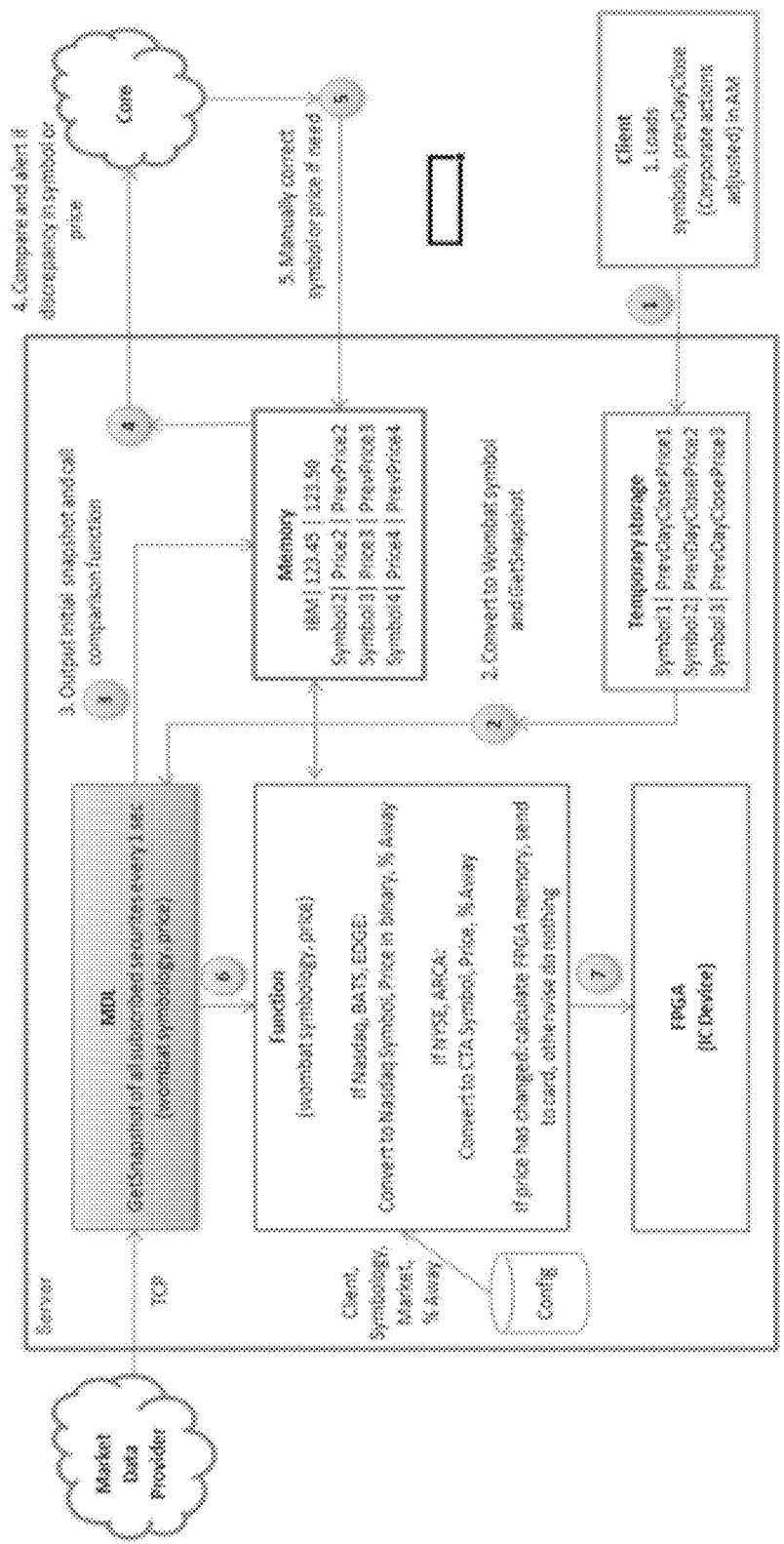
FIG. 6 illustrates an embodiment of a workflow process for periodically reconciling a customer's tradable universe with market conditions.

FIG. 6 illustrates an embodiment of a workflow process for periodically reconciling a customer's tradable universe with market conditions. Using the example of shares of IBM, the invention periodically compares older market conditions in system memory for IBM securities with recent orders or market dynamics, and adjusts the pricing in memory so that pricing is current, or as close to current market conditions as possible. For example, shortly before markets open at 9:30 AM, the device will retrieve (or a user will upload) the previous day's closing price for IBM from a market data provider such as Wombat Financial Software, Inc. (New York, N.Y.), and will replace any older pricing in memory with the uploaded pricing. After markets open and orders for IBM are processed during the course of the day, the device will replace any pricing in memory with the price from the most recent order for IBM. The device can also check for new pricing on a periodic basis, such as every second or every minute, to ensure that pricing in memory reflects current market conditions. The inventive IC device will retrieve pricing for other securities (besides IBM) in the customer's tradable universe in a comparable manner.

Figure 7:
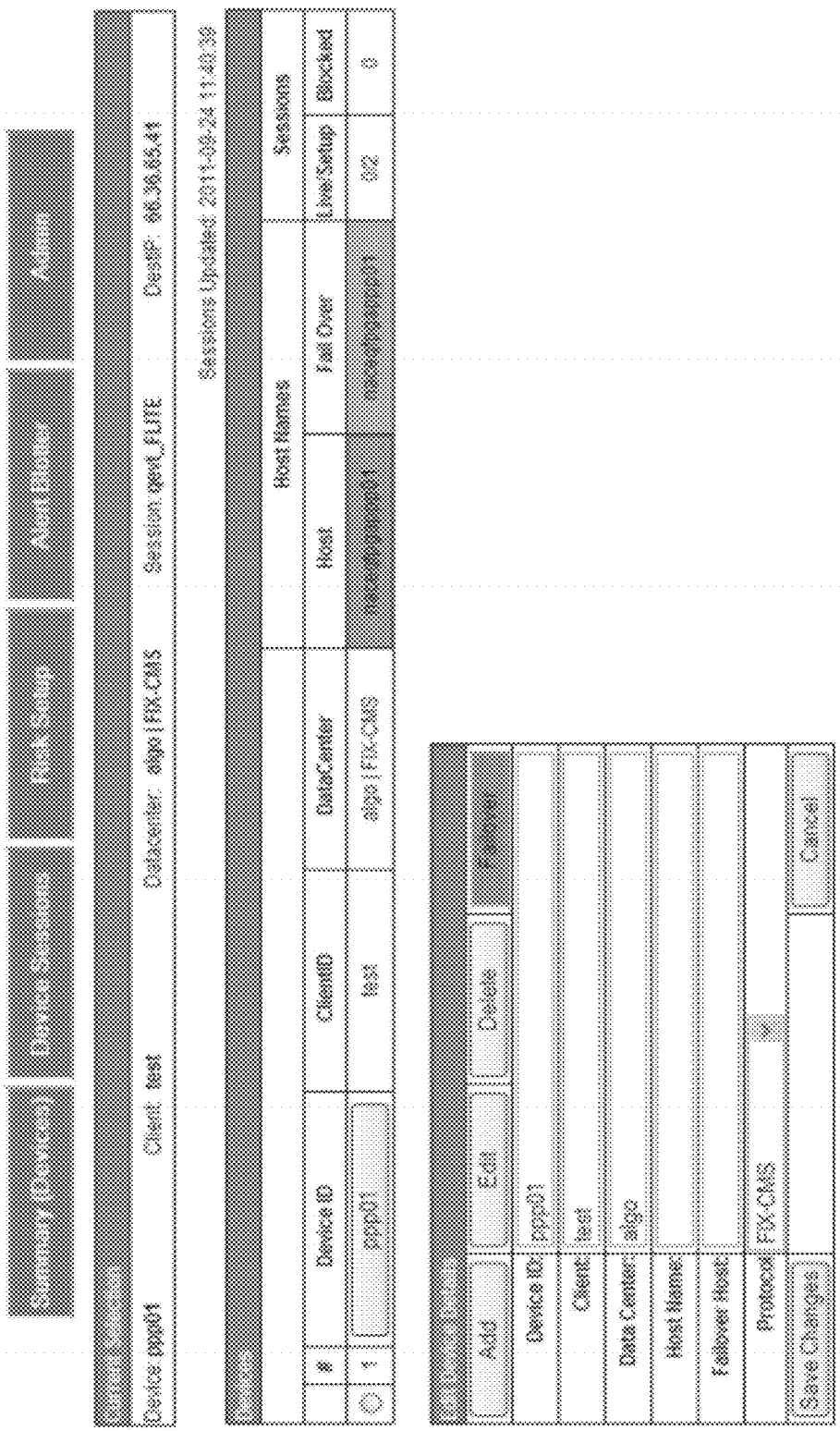
FIG. 7 illustrates an embodiment of a graphical user interface comprising hardware settings and risk management rules for an IC device in accordance with the present invention.

FIG. 7 illustrates an embodiment of a graphical user interface comprising hardware settings and risk management rules for an IC device in accordance with the present invention. As previously discussed, the invention can comprise a graphical user interface to allow for modification of the hardware instructions embedded in the IC device. The upper portion of the Figure illustrates modification of administrative and device settings, such as device identification number, installation location, and network parameters. The user interface can be used in connection with any kind of order messaging protocol, such as but not limited to OUCH or FIX.

The lower portion of FIG. 7 illustrates examples of risk criteria which can be embedded in the device. A non-limiting list of examples of such risk criteria can include maximum number of shares per order, maximum order size, maximum order notional value, and application of a restricted securities list. These settings can be readily changed, for example by modifying an operator (e.g. <, >) or the numerical value of a particular criterion, or enabling or disabling a setting by ticking a checkbox.

Depending upon the particular implementation of the invention, additional or alternative risk criteria can be embedded in the IC device. After any risk criteria are modified, the new criteria are embedded in the IC device, for example, by using a compiler or other programming means, so that the IC device contains the updated hardware instructions. The particular means for the updated embedding hardware instructions on the IC device will depend on the specific implementation of the invention. The use of a reprogrammable IC device permits updating of hardware instructions any number of times.

Example 1

The following example illustrates the use of the present invention for conducting risk management assessments with orders entering over the NASDAQ OUCH protocol. The example is by no means considered as restricting or limiting the present invention.

A message packet for a new order may have the following exemplary configuration:

---

Payload: 51 bytes, New order length = 48 bytes (agrees with OUCH spec)
Order:
00:31:55:4f:48:41:41:51:44:50:47:32:52:48:49:41:41:41:42:00:00:00:c8:5a:56:5a:5a:54
:20:20:20:01:31:2d:00:00:01:86:9e:48:44:53:4e:59:41:4e:00:00:00:00:4e
Decoded:
00:31 - SoupTCP length = 49 bytes (number of bytes after this field until the next packet)
55 - U (Unsequenced Data Packet) on SoupTCP
4f - O - new order
48:41:41:51:44:50:47:32:52:48:49:41:41:41: - 14 bytes for order token
42: - B - buy order
00:00:00:c8 - 200 shares
5a:56:5a:5a:54:20:20:20 - 'ZVZZT ' - symbol
01:31:2d:00 - 002000.0000 fixed point format with 6 whole numbers places followed by 4 decimal digits
00:01:89:9e - Market hours (time in force)
48:44:53:4e - HSDN (firm)
59 - Y (display)
41 - A (capacity)
4e - N (ISO)

-continued

00:00:00:00 - 0 (minimum quantity)
4e - N (cross type)

NASDAQ utilizes two hot/hot ip/ports per session. For example, if a customer has 3 ports to NASDAQ, the setup arrangement will have the following configuration (primary/backup):

Session1—ip1a:port1a and ip1b:port1b
Session2—ip2a:port2a and ip2b:port2b
Session3—ip3a:port3a and ip3b:port3b In this embodiment, all risk metrics are set up as a session identifiable by a pair of IP addresses and ports. If a session is blocked due to a security breach or a transaction failing one or more risk management criteria, both IP addresses would be blocked.

To further streamline examination of orders according to the predefined risk criteria, not all of the packets of a message need to be inspected. For example, if the protocol=TCP (0x06), targeting predefined IPs and ports, the system may only need to review SoupTCP messages with type "U" (3rd byte) and New Orders (type "O"—4th byte) or Replace orders (type="U"—4th byte).

If the order is a cancel order (type="C"—4th byte), it may be passed through the system without inspection, considering it is the only message in the packet. Based on packet length, SoupTCP length, and Cancel message length (19 bytes), the system can quickly conduct such a review. Latency on cancellation orders can be shorter than on other types of orders since the messages would be passed directly to the exchange after the system determines the message is an order cancellation.

If a packet is being re-transmitted and it has already been checked by the system (the sequence number is less than the last checked message), the packet can be forwarded to the exchange without inspection. Alternatively, a re-transmitted packet can be treated as a regular incoming packet and be re-inspected by the risk filters.

Partial packets can be reviewed to the maximum extent possible. For example, in accordance with a store-and-forward embodiment of the invention, if a packet containing 2.5 messages, the system can review the two complete messages, and store the remaining 0.5 message in memory until the system obtains the remaining portion of the message. For example, by looking at TCP sequence numbers, the system can determine which partial packets form a particular message. When the entire message is received, the system may then inspect the message to determine whether it will pass the pre-defined risk management criteria.

If the system received an out-of-sequence packet and the packet contains one or more complete messages, the system can check the out-of-sequence packet as a regular packet. If the out-of-sequence packet contains only complete messages, the system may bypass storage of the packet. If there is a partial message in the out-of-sequence packet, the system may store the entire copy of the packet until it receives the in-sequence packet.

While the invention has been particularly shown and described with reference to particular embodiments, those skilled in the art will understand that various changes in form and details may be made without departing from the spirit and scope of the invention.

What is claimed is:

1. A computer system for performing risk assessment of a securities transaction at wire speed without processing software instructions, the computer system comprising:
(A) memory;
(B) a network connection; and
(C) a reprogrammable integrated circuit (IC) device comprising non-transitory embedded hardware instructions coding for a method comprising the steps of:
a) receiving by the IC device an incoming order for the securities transaction;
b) parsing the order by the IC device into a plurality of order components;
c) evaluating by the IC device one or more order components in accordance with pre-established risk criteria; and
d1) if the order components pass the pre-established risk criteria, permitting the order to pass to a securities exchange for subsequent handling; or
d2) if the order components do not pass the pre-established risk criteria, truncating the order before passing the order to a securities exchange,
wherein the embedded hardware instructions are non-transitory and are processed without software instructions loaded in volatile computer memory.

2. The computer system according to claim 1, wherein the IC device is an FPGA, PAL, PLA, or CPLD device.

3. The computer system according to claim 1, wherein the IC device can handle a throughput of about 500,000 incoming orders per second and support a minimum of about 30 TCP sessions.

4. The computer system according to claim 1, wherein the IC device is reprogrammable locally or remotely.

5. The computer system according to claim 1, wherein the pre-established risk criteria comprise one or more risk management criteria selected from the group consisting of a restricted securities trading list; minimum or maximum order size; minimum or maximum order dollar value; minimum or maximum notional value; order type; broker identification; and securities or currency settings.

6. The computer system according to claim 1, wherein the IC device further comprises embedded hardware instructions to periodically receive updated pre-established risk criteria.

7. The computer system according to claim 1, wherein the IC device further comprises embedded hardware instructions for logging inspected orders.

8. The computer system according to claim 1, wherein the incoming order enters the device in an exchange-specific format.

9. The computer system according to claim 8, wherein the format is FIX, OUCH, or ArcaDirect.

10. The computer system according to claim 1, wherein the IC device further comprises embedded hardware instructions for completely truncating an order before the order can pass to the securities exchange.

11. The computer system according to claim 1, wherein the IC device further comprises embedded hardware instructions for blocking a session due to a securities breach or a transaction failing one or more criteria.

12. A method for performing risk assessment of a securities transaction using a reprogrammable integrated circuit (IC)

device containing non-transitory embedded hardware instructions for performing the method, the method performed by computer hardware at wire speed without processing software instructions and comprising the steps of:

a) forwarding to the IC device an order for the securities transaction;

b) parsing the order by the IC device into a plurality of order components;

c) evaluating by the IC device one or more order components in accordance with pre-established risk criteria; and d1) if the order components pass the pre-established risk criteria, permitting the order to pass to a securities exchange for subsequent handling; or d2) if the order components do not pass the pre-established risk criteria, truncating the order before passing the order to a securities exchange.

13. The method according to claim 12, wherein the IC device is an FPGA, PAL, PLA, or CPLD device.

14. The method according to claim 12, wherein the securities transaction is a purchase or sale of equity securities, debt securities, or currency instruments.

\* \* \* \* \*